US 6,571,036 B2

(12) United States Patent
Deng et al.

(10) Patent No.: US 6,571,036 B2
(45) Date of Patent: May 27, 2003

(54) STRUCTURE FACILITATING EASY ASSEMBLY OF FIBER-OPTIC COMMUNICATION COMPONENTS

(75) Inventors: Jau-Jan Deng, Taipei (TW); Chin-Hsing Lin, Taipei Hsien (TW)

(73) Assignees: E-Pin Optical Industry Co., Ltd., Taipei (TW); Wanshin Electronic Co., Ltd., Taipei Hsien (TW)

( * ) Notice: Subject to any disclaimer, the term of this patent is extended or adjusted under 35 U.S.C. 154(b) by 0 days.

(21) Appl. No.: 09/982,751

(22) Filed: Oct. 22, 2001

(65) Prior Publication Data

US 2003/0077035 A1 Apr. 24, 2003

(51) Int. Cl.7 .................................................. G02B 6/32
(52) U.S. Cl. ............................................ 385/33; 33/34
(58) Field of Search .......................... 385/15–23, 27, 385/31, 33–35, 38, 39, 43, 48–52, 73, 74

(56) References Cited

U.S. PATENT DOCUMENTS 4,732,449 A * 3/1988 Fan ............................. 385/33
4,733,931 A * 3/1988 Fan ............................. 385/33
5,247,595 A * 9/1993 Foldi ........................... 385/78
6,396,980 B1 * 5/2002 Liu et al. ...................... 385/34

* cited by examiner

Primary Examiner—Hemang Sanghavi
Assistant Examiner—Scott A Knauss
(74) Attorney, Agent, or Firm—Dennison, Schultz & Dougherty

(57) ABSTRACT

A structure facilitating easy assembly of fiber-optic communication components includes a lower and an upper support being provided with small and big V-shaped cuts, respectively, for receiving optical fibers and collimators, respectively. The upper support is inverted to seat on a middle recess of the lower support, such that tangent planes passing top points of the optical fibers and the collimators are contained in horizontal planes passing openings of the small and the big V-shaped cuts, respectively, and axes of the collimators are either in alignment with or horizontally coplanar with axes of the optical fibers. The two supports together define a central positioning cavity between them for receiving different function elements, such as optical isolator, modularized filter, etc., between the collimators, so that fiber-optic communication components with reduced volume and increased reliability could be easily assembled in mass production at reduced cost.

5 Claims, 6 Drawing Sheets

STRUCTURE FACILITATING EASY ASSEMBLY OF FIBER-OPTIC COMMUNICATION COMPONENTS

BACKGROUND OF THE INVENTION

The present invention relates to a structure facilitating assembly of fiber-optic communication components, and more particularly to a structure enabling well-aligned connection of optical fibers in assembling fiber-optic communication components. The structure includes a lower and an upper support being provided with small and big V-shaped cuts, respectively, for receiving optical fibers and collimators, respectively. The upper support is inverted to seat on a middle recess of the lower support, such that tangent planes passing top points of the optical fibers and the collimators are contained in horizontal planes passing openings of the small and the big V-shaped cuts, respectively, and axes of the collimators are either in alignment with or horizontally coplanar with axes of the optical fibers. The two supports together define a central positioning cavity between them for receiving different function elements between the collimators, so that fiber-optic communication components with reduced volume and increased reliability could be easily assembled in mass production at reduced cost.

It is known that a fiber-optic communication component usually has the function of coupling a light beam transmitted via an input fiber to a collimator, so that the collimated beam passes one or more function elements included in the communication component before it passes a mating collimator and is coupled to an output fiber to continue transmission of the light beam. The collimators may be Graded Index (GRIN) lenses, C-lenses, aspheric lenses, or other suitable lenses. In all cases, the collimators may be cylindrical members. Since the optical fibers usually have a fiber core from only several microns ($\mu$m or $10^{-6}$ m) to several decades of microns in diameter, any alignment error in coupling the fibers would result in increased insertion loss of the communication component, making the same failed to meet required specifications. Therefore, it is very important for any structure for assembling fiber-optic communication components to have the function of precisely aligning and connecting optical fibers.

In a conventional way of manufacturing the fiber-optic communication components, all related parts are usually positioned on a precision platform. Alignments and adjustments of degree of freedom in five directions, namely, X-axis, Y-axis, Z-axis, angle $\theta$, and angle $\Phi$, (see FIG. 2A) for these parts are performed through control of the precision platform. Thereafter, the aligned and adjusted parts are fixed in place by way of bonding or welding to complete the assembly of the fiber-optic communication components. In the above-described assembling structure, the whole process of alignment and adjustment is time and effort consuming, and it is uneasy to maintain the relative positions of the assembled parts in a stable condition. The bonded parts tend to be affected by external environments and are therefore subject to changes in their relative positions, resulting in alignment error. In the case of welding parts together, the high temperature occurred in the process of welding would result in displacement of previously aligned parts and accordingly increased insertion loss. In brief, the conventional structure for assembling the fiber-optic communication components has many disadvantages, including the involvement of complicate and troublesome optical alignments and adjustments, the insufficient function of aligning and adjusting optical fibers, etc., that prevent effective control of production cost and increased productivity of the fiber-optic communication components. It is therefore tried by the inventor to develop an improved structure that eliminates the disadvantages existing in the conventional structure for assembling fiber-optic communication components.

SUMMARY OF THE INVENTION

A primary object of the present invention is to provide a structure facilitating easy assembly of fiber-optic communication components. The structure includes a lower and an upper support being provided with small and big V-shaped cuts, respectively, for receiving optical fibers and collimators, respectively. The upper support is inverted to seat on a middle recess of the lower support, such that tangent planes passing top points of the optical fibers and the collimators are contained in horizontal planes passing openings of the small and the big V-shaped cuts, respectively, and axes of the collimators are either in alignment with or horizontally coplanar with axes of the optical fibers.

Another object of the present invention is to provide the above-described structure facilitating easy assembly of fiber-optic communication components, wherein the small V-shaped cuts include a first and a second small V-shaped cut correspondingly provided and spaced on the lower support for receiving and locating an input and an output optical fiber, respectively, the big V-shaped cuts include a first and a second big V-shaped cut correspondingly provided and spaced on the upper support for receiving and locating a collimator and a mating collimator, respectively, and the lower and the upper supports together define a positioning cavity between them for receiving function elements between the collimator and the mating collimator, so that optical alignments and adjustments of the input and the output fibers could be simplified while the fibers are well aligned, and the whole fiber-optic communication components could be easily assembled to effectively control the manufacturing cost and the productivity thereof.

A further object of the present invention is to provide the above-described structure facilitating easy assembly of fiber-optic communication components, wherein the positioning cavity may be designed into different dimensions to match with different function elements to be received in the positioning cavity, so that assembly of different fiber-optic communication components having effectively reduced dimensions could be easily achieved.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
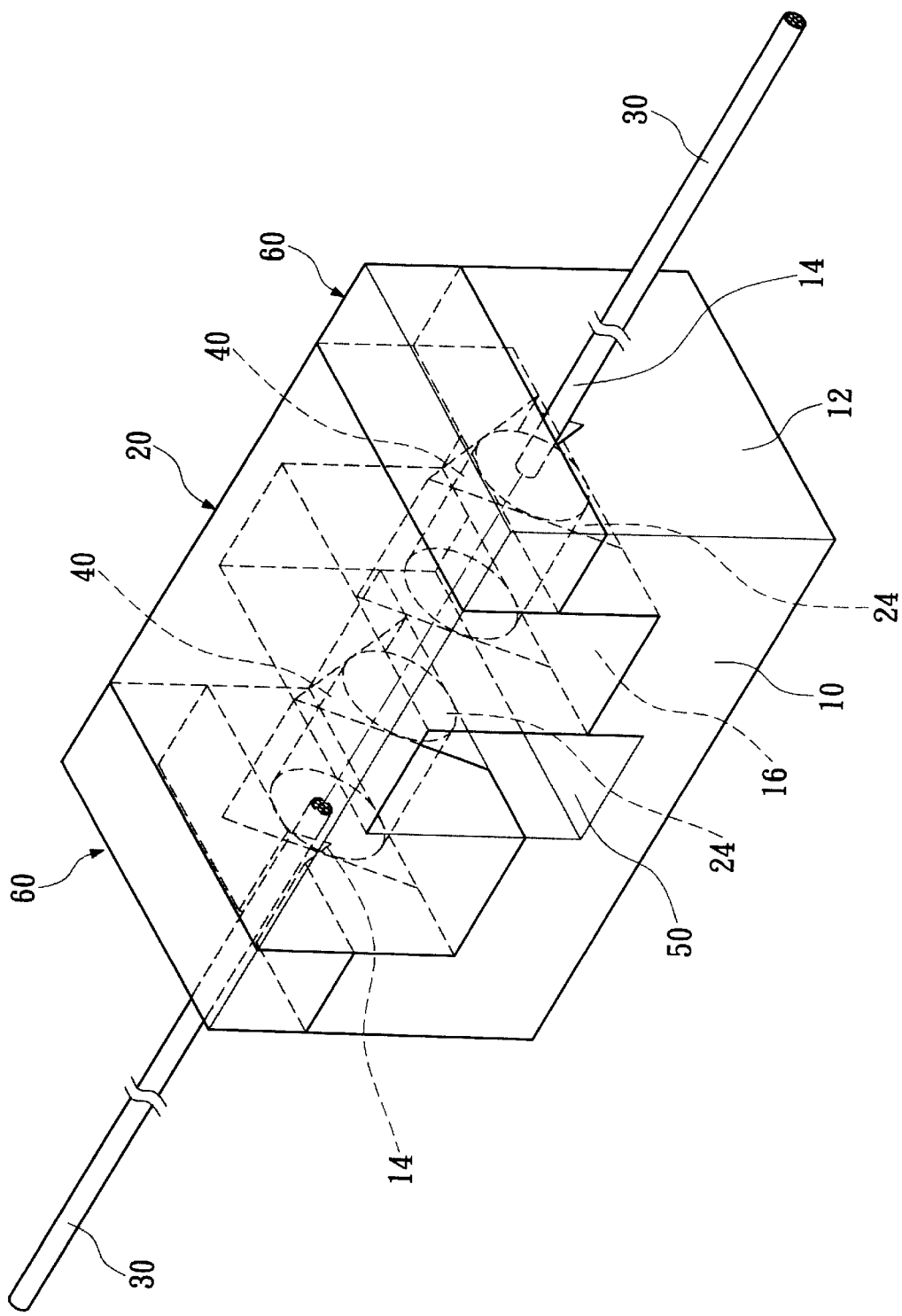
FIG. 1 is an assembled perspective view of a structure facilitating easy assembly of fiber-optic communication components according to an embodiment of the present invention.
Figures 2, 2A:
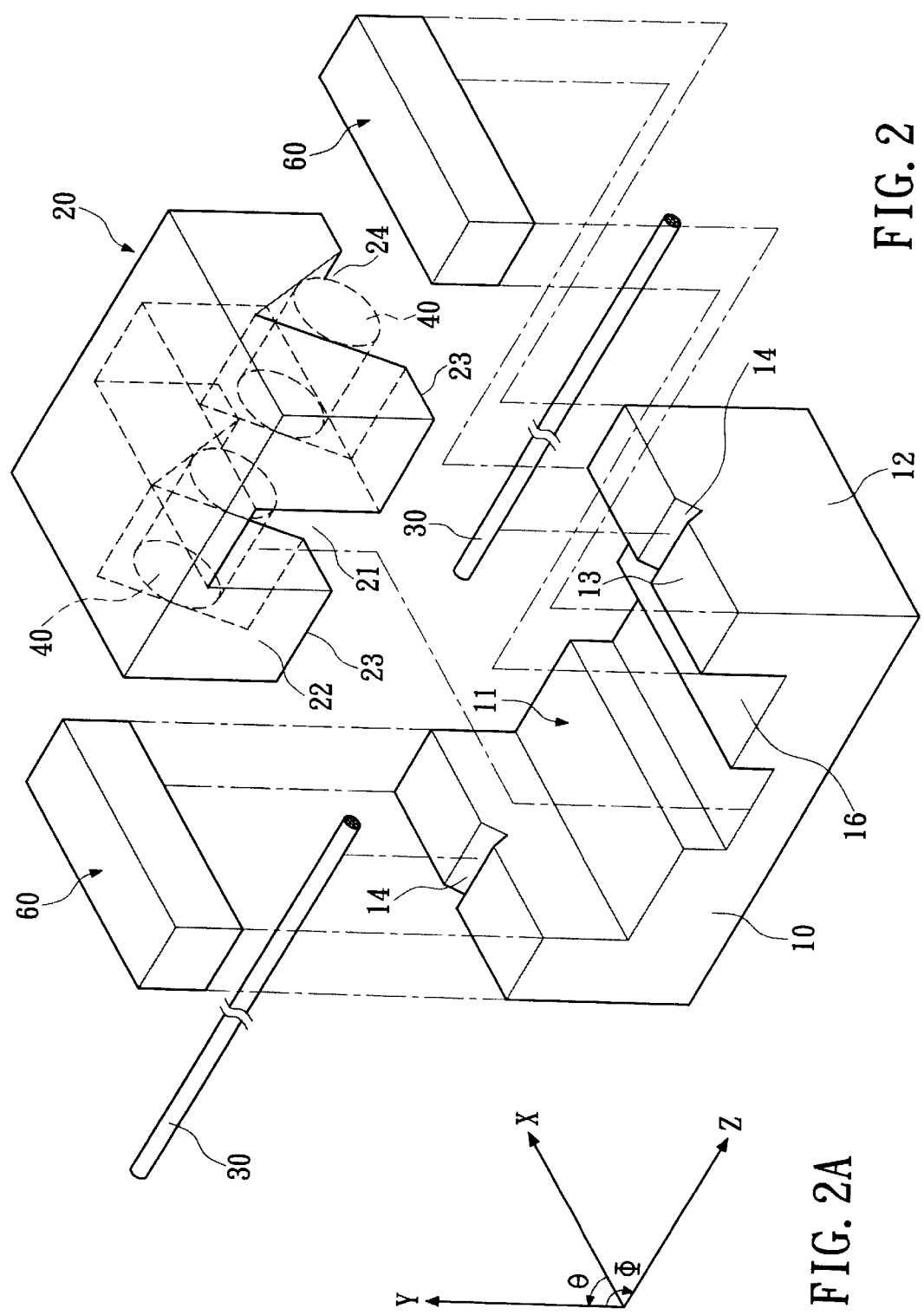
FIG. 2 is an exploded perspective view of FIG. 1.
FIG. 2A is an explanatory drawing showing five aligning directions, namely, X-axis, Y-axis, Z-axis, angle $\theta$, and angle $\Phi$, referred to in the present invention.
Figure 4:
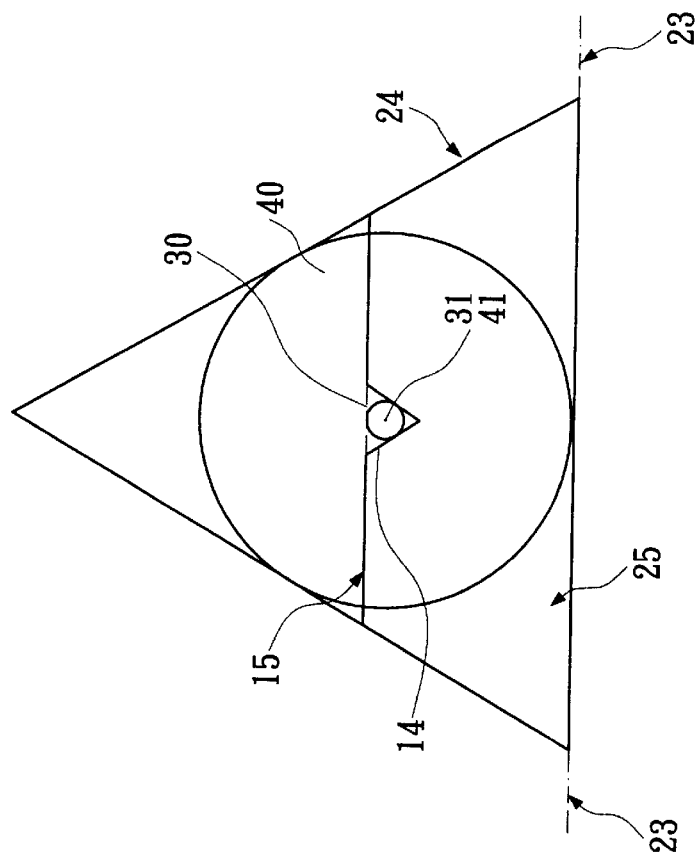
FIG. 4 is a sectional view showing a collimator and an optical fiber are aligned with each other in the structure of the present invention.
Figure 3:
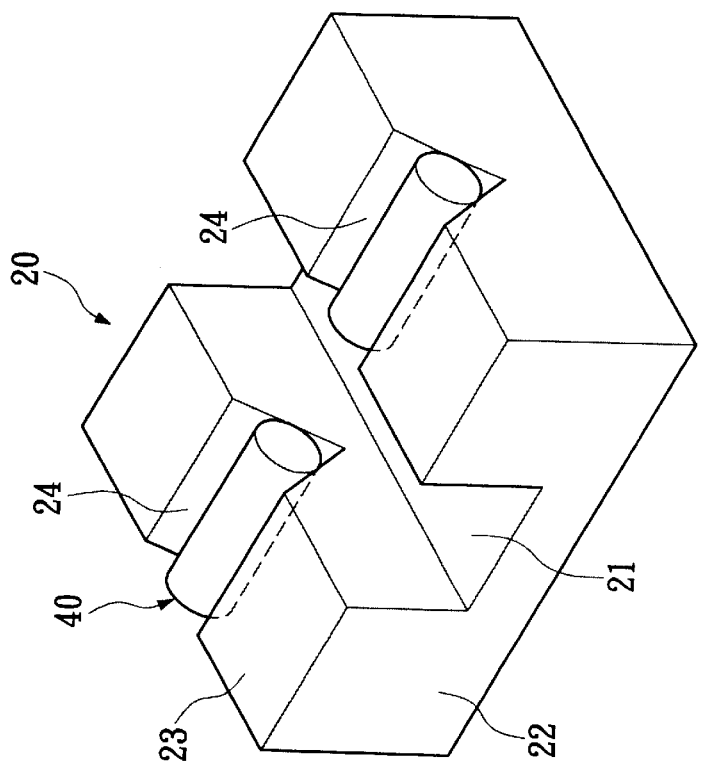
FIG. 3 is a perspective view of an upper support included in the structure shown in FIG. 1.

Please refer to FIGS. 1 to 4 that show a structure according to an embodiment of the present invention to facilitate easy assembly of fiber-optic communication components. As shown, the structure of the present invention mainly includes a lower support 10 and an upper support 20.

The lower support 10 is a substantially U-shaped body having two vertical side walls 12 defining a middle recess 11 between them. The upper support 20 is also a substantially U-shaped body having two vertical side walls 22 defining a middle recess 21 between them. The upper support 20 has dimensions smaller than that of the lower support 10, such that the upper support 20 could be turned upside down to fitly seat on the middle recess 11 of the lower support 10.

The lower support 10 is provided at tops 13 of the two side walls 12 with two small V-shaped cuts 14, onto which two optical fibers 30 are separately positioned. The upper support 20 is provided at tops 23 of the two side walls 22 with two big V-shaped cuts 24, onto which two collimators 40 are separately positioned. The collimators 40 may be GRIN lenses, C-lenses or Aspheric lenses. When the upper support 20 is inverted to seat on the middle recess 11 of the lower support 10, the tops 23 are fitly seated on an inner bottom surface 16 of the middle recess 11.

According to currently available manufacturing techniques, the lower support 10, the middle recess 11 and the small V-shaped cuts 14, and the upper support 20 and the big V-shaped cuts 24 may be formed in more than one way, such as anisotropic etching on a monocrystal silicon chip in (1,1,1) direction, machining with precision tools, or injection, compression or molding of different materials, such as plastics, glass, fiber glass, etc., with precision dies. A manufacturer may select a most suitable way depending on available equipment and actual need.

Since the lower support 10 with the middle recess 11 and the small V-shaped cuts 14 and the upper support 20 with the big V-shaped cuts 24 may be precisely machined, compressed or molded to fit one another, it is possible to locate each collimator 40 in the big V-shaped cut 24 with a tangent plane passing a top point of the collimator 40 precisely aligned with a horizontal plane 25 passing an opening of the big V-shaped cut 24, and to locate each optical fiber 30 in the small V-shaped cut 14 with a tangent plane passing a top point of the optical fiber 30 precisely aligned with a horizontal plane 15 passing an opening of the small V-shaped cut 14. In this manner, the optical fibers 30 and the collimators 40 may be precisely located in the small and the big V-shaped cuts 14 and 24, respectively, with axes 41 of the collimators 40 and axes 31 of the optical fibers 30 precisely aligned with one another or located at the same horizontal plane.

When assembling a fiber-optic communication component with the structure of the present invention, a light beam transmitted via an input fiber 30 is coupled to a collimator 40, and the collimated beam passes through one or more function elements before it passes through another mating collimator 40 and is coupled to an output fiber 30. In this manner, alignments needed in the entire light beam transmission, which involve alignments and adjustments of the degree of freedom in five directions, namely, X-axis, Y-axis, Z-axis, angle $\theta$, and angle $\Phi$ (see FIG. 2A, wherein the optical fibers 30 are extended in parallel with Z-axis) in the conventional fiber-optic communication component manufacturing process, now involve alignments and adjustments only in one or two directions, that is, X-axis and/or Y-axis, and ranges for searching and aligning are reduced to only a few microns ($\mu$m). This largely reduces the time needed for alignment and simplifies the optical alignments and adjustments while enables easy accomplishment and improvement of well-aligned connection of optical fibers, and mass production of fiber-optic communication components at reduced cost.

The lower support 10 and the inverted upper support 20 together define a space between them to provide a central positioning cavity 50 for receiving function elements between two mating collimators 40. The positioning cavity 50 may be sized and shaped depending on the function elements or combinations of multiple sets of function elements to be received therein, so that different function elements or different combinations of multiple sets of function elements may be easily positioned in the positioning cavity 50 and accurately located therein to quickly assemble into functionally different or multi-function fiber-optic communication components. The multi-function fiber-optic communication components so formed may have effectively reduced overall volumes.

After necessary alignments, the lower and the upper supports 10, 20 are bonded or welded at their contacting surfaces. Since the lower and the upper supports 10, 20 are precisely designed and firmly bonded or welded together, the function elements positioned therebetween are not subject to change in their relative positions due to an external force. Problems such as twisted and deformed bonding due to external environments, shift of previously aligned elements due to a high temperature in the process of welding, etc., all could be effectively eliminated to actually reduce alignment error and insertion loss. The function elements received in the lower and the upper supports 10, 20 are not subject to changes in their relative positions even the bonding or the welding is affected by external environments. Therefore, the fiber-optic communication components assembled with the structure of the present invention provide increased reliability after being packaged. Thereafter, two hold-down strips 60 are mounted on the tops 13 of the two side walls 12 of the lower support 10 to restrict the fibers 30 within the small V-shaped cuts 14, and a metal case is then covered onto the structure of the present invention to complete the assembly of a fiber-optic communication component.

The relative positions of the small V-shaped cuts 14 for locating the fibers 30 and of the big V-shaped cuts 24 for locating the collimators 40 on the lower and the upper supports 10, 20, respectively, may be precisely designed according to an offset of optical path possibly caused by the function elements to be received in the central positioning cavity 50 between the two collimators 40.

Figure 5:
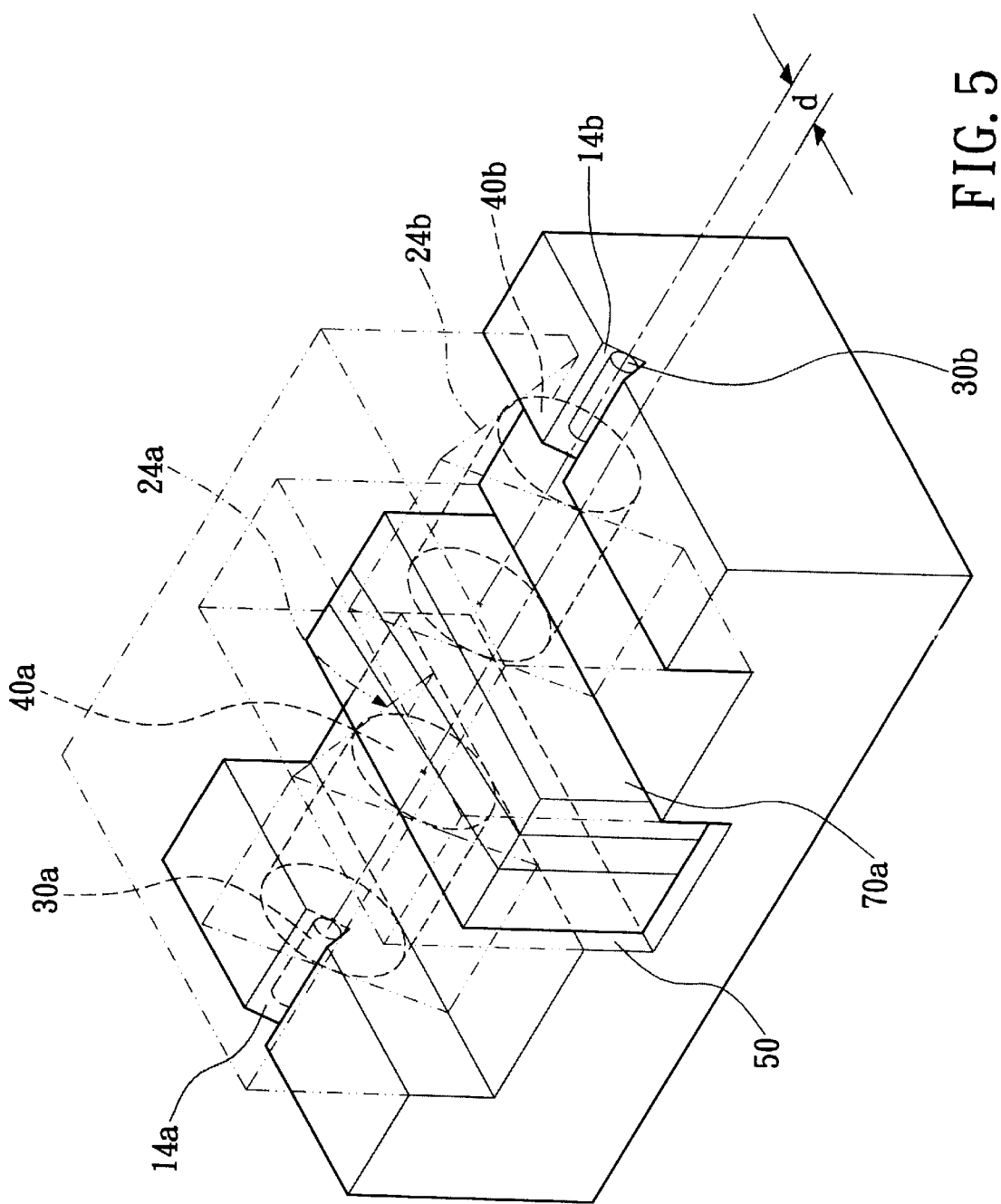
FIG. 5 is an assembled perspective view showing the assembly of an optical isolator with the structure of the present invention.

Please refer to FIG. 5 that shows a fiber-optic communication component named optical isolator being assembled by positioning an optical isolator core 70a in the central positioning cavity 50 provided on the structure of the present invention. Since the optical isolator core 70a will cause an offset in an optical path that was previously aligned with an axis of a collimator 40*a*, it is necessary to incorporate a horizontal offset 'd' into an axis of a mating collimator 40*b* corresponding to the offset in the optical path. In other words, a big V-shaped cut 24*b* for locating the mating collimator 40*b* and a small V-shaped cut 14*b* for locating an output fiber 30*b* all must be horizontally deviated from a big V-shaped cut 24*a* for the collimator 40*a* and a small V-shaped cut 14*a* for an input fiber 30*a*, respectively, by a distance equal to the offset 'd'.

Figure 6:
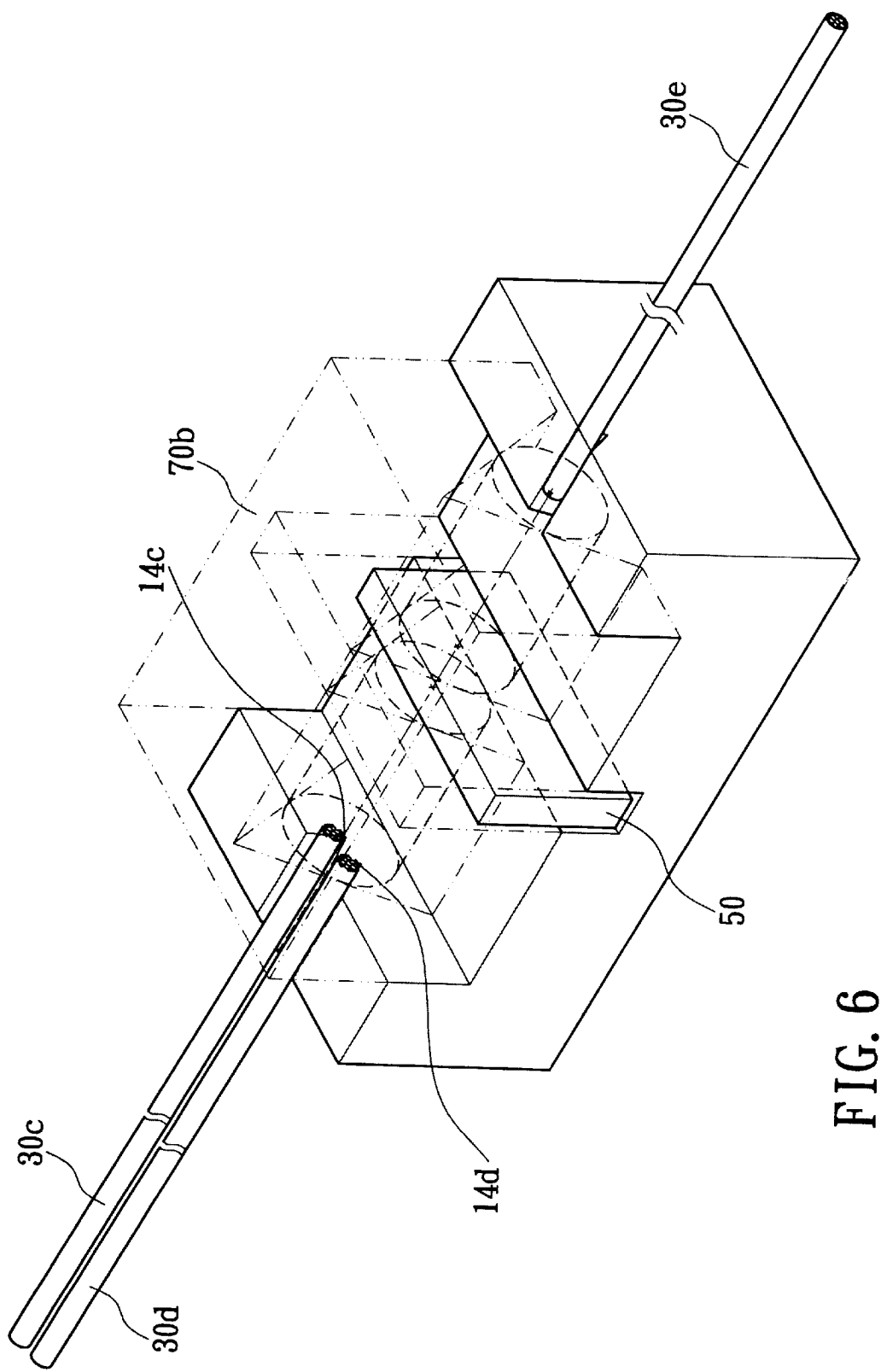
FIG. 6 is an assembled perspective view showing the assembly of a 3-port DWDM (Dense Wavelength Division Multiplexing) filter or a beam combiner with the structure of the present invention.

FIG. 6 shows another embodiment of fiber-optic communication component assembled with the structure of the present invention. The fiber-optic communication component of FIG. 6 includes an input fiber 30*c*. A light beam transmitted via the input fiber 30*c* passes through a modularized filter plate 70*b* positioned in the central positioning cavity 50 and is split into two beams. Thus, there are provided two output fibers, namely, a first output fiber 30*d* for collecting reflected light and a second output fiber 30*e* for collecting transmitted light. Accordingly, two parallel small V-shaped cuts 14*c* and 14*d* are provided in this case for locating the fibers 30*c* and 30*d*, respectively. In the event the modularized filter plate 70*b* is a band-pass filter, the fiber-optic communication component in this embodiment is a 3-port DWDM (Dense Wavelength Division Multiplexing) filter. And, in the event the modularized filter plate 70*b* is a high-pass filter or a low-pass filter, the fiber-optic communication component in this embodiment is a beam combiner or a beam splitter, respectively.

Figure 7:
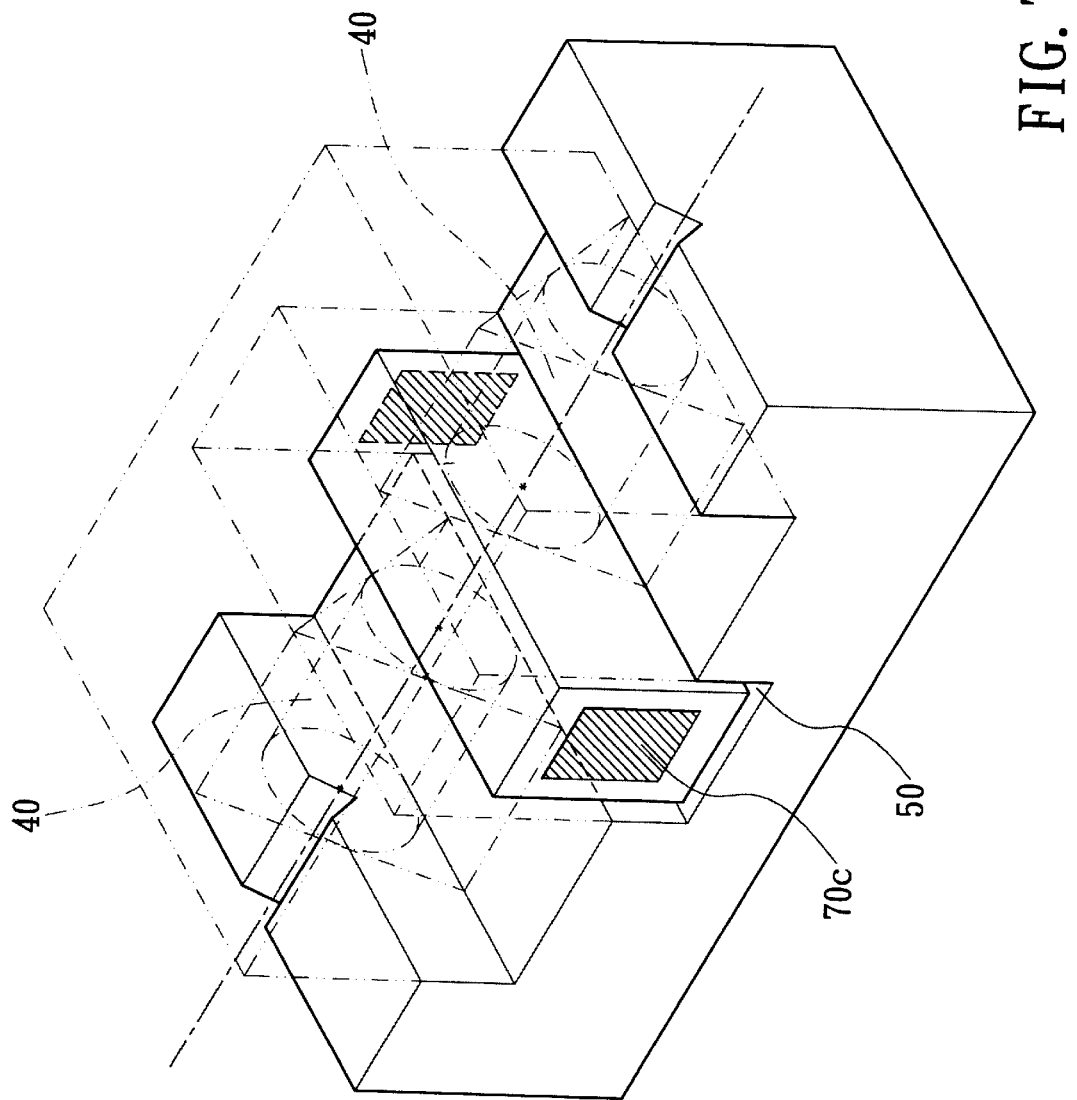
FIG. 7 is an assembled perspective view showing the assembly of an optical modulator with the structure of the present invention.

Please refer to FIG. 7 that shows another fiber-optic communication component named optical modulator being assembled by positioning a modulator-added optical crystal 70*c* in the positioning cavity 50 provided on the structure of the present invention.

Since the positioning cavity 50 may be designed according to function elements or combinations of multiple sets of function elements to be received therein, different function elements or different combinations of multiple sets of function elements may be easily positioned in the positioning cavity 50 and accurately located therein to quickly assemble into communication components of different functions or multi-function communication components that have effectively reduced overall dimensions.

What is claimed is:

1. A structure facilitating easy assembly of fiber-optic communication components, said fiber-optic communication components enabling a light beam transmitted via an input optical fiber to be coupled to a collimator to obtain a collimated beam that passes through one or more function elements before passing through a mating collimator and being coupled to an output optical fiber, so that transmission of said light beam via optical fibers is continued; said structure comprising a lower support and an upper support;

said lower support being provided with small V-shaped cuts for receiving and locating said optical fibers therein, such that first tangent planes passing top points of said optical fibers are contained in horizontal planes passing openings of said small V-shaped cuts, respectively;

said upper support being provided with big V-shaped cuts for receiving and locating said collimators therein, such that second tangent planes passing top points of said collimators are contained in horizontal planes passing openings of said big V-shaped cuts, respectively; and axes of said collimators being either in alignment with or horizontally coplanar with axes of said optical fibers, respectively, to simplify optical alignments and adjustments in forming said fiber-optic communication components and ensure well-aligned connection of said optical fibers.

2. The structure facilitating easy assembly of fiber-optic communication components as claimed in claim 1, wherein said small V-shaped cuts includes a first and a second small V-shaped cut correspondingly provided and spaced on said lower support for receiving and locating said input optical fiber and said output optical fiber, respectively; and said big V-shaped cuts including a first and a second big V-shaped cut correspondingly provided and spaced on said upper support for receiving and locating said collimator and said mating collimator, respectively; and said lower and said upper supports together defining a positioning cavity between them for receiving function elements between said collimator and said mating collimator.

3. The structure facilitating easy assembly of fiber-optic communication components as claimed in claim 1, wherein said positioning cavity is designed into different dimensions to match with different function elements to be received in said positioning cavity, so that assembly of different fiber-optic communication components may be easily achieved.

4. The structure facilitating easy assembly of fiber-optic communication components as claimed in claim 1, wherein said upper support is a substantially U-shaped body having two vertical side walls that together define a middle recess therebetween, and said upper support being so dimensioned that it could be inverted to fitly seat on a middle recess formed on said lower support.

5. The structure facilitating easy assembly of fiber-optic communication components as claimed in claim 1, further comprises hold-down strips for restricting said optical fibers within said small V-shaped cuts of said lower support.

* * * * *